US008287219B2

(12) United States Patent
Opper et al.

(10) Patent No.: US 8,287,219 B2
(45) Date of Patent: Oct. 16, 2012

(54) FASTENING ARRANGEMENT

(75) Inventors: Reinhold Opper, Buseck (DE); Jochen Hain, Echenburg-Wissenbach (DE)

(73) Assignee: Newfrey LLC, Newark, DE (US)

( * ) Notice: Subject to any disclaimer, the term of this patent is extended or adjusted under 35 U.S.C. 154(b) by 737 days.

(21) Appl. No.: 11/943,068

(22) Filed: Nov. 20, 2007

(65) Prior Publication Data

US 2008/0118325 A1 May 22, 2008

(30) Foreign Application Priority Data

Nov. 20, 2006 (DE) ......................... 10 2006 056 065

(51) Int. Cl.
*F16B 37/14* (2006.01)

(52) U.S. Cl. ......................... 411/431; 411/301; 411/337

(58) Field of Classification Search .................. 411/177, 411/171, 373, 386, 301, 999, 970, 377, 431
See application file for complete search history.

(56) References Cited

U.S. PATENT DOCUMENTS

| | | | | | |
|---|---|---|---|---|---|
| 2,761,484 | A | * | 9/1956 | Sternick et al. | 411/353 |
| 3,030,997 | A | | 4/1962 | Collins | |
| 3,270,610 | A | * | 9/1966 | Knowlton | 411/427 |
| 3,439,575 | A | * | 4/1969 | Gifford | 411/386 |
| 4,002,390 | A | | 1/1977 | Perry et al. | |
| 4,013,110 | A | | 3/1977 | Darling | |
| 4,192,215 | A | | 3/1980 | Hymans | |
| 4,411,934 | A | | 10/1983 | Steinhagen | |
| 4,525,014 | A | | 6/1985 | Holman et al. | |
| 4,666,190 | A | | 5/1987 | Yamabe et al. | |
| 4,846,611 | A | | 7/1989 | Sadri et al. | |
| 4,873,763 | A | * | 10/1989 | Volonta et al. | 29/825 |
| 4,875,817 | A | * | 10/1989 | Suzumura et al. | 411/171 |
| 4,883,399 | A | | 11/1989 | MacLean | |
| 4,900,206 | A | * | 2/1990 | Kazino et al. | 411/377 |
| 4,925,353 | A | | 5/1990 | Perugini | |
| 5,075,176 | A | | 12/1991 | Brinkmann | |
| 5,131,855 | A | | 7/1992 | Pickering | |
| 5,193,716 | A | * | 3/1993 | Horiki et al. | 221/1 |

(Continued)

FOREIGN PATENT DOCUMENTS

DE 44 25 839 1/1996

(Continued)

OTHER PUBLICATIONS

Exhibit 1 Showing Stud, Nut and Terminal dated Nov. 2, 1999, (1 page).

(Continued)

*Primary Examiner* — Flemming Saether

(74) *Attorney, Agent, or Firm* — Harness, Dickey & Pierce, P.L.C.

(57) ABSTRACT

A fastening arrangement having a first fastening part which is connected to a metal sheet and has a first threaded section, and having a second fastening part which has a second threaded section which engages with the first threaded section, with the fastening parts fixing an electrical connecting part such that an electrical connection is formed between the connecting part and the metal sheet. A cover part is fixed to the first fastening part in an end position and, in a covering position, has covered at least a part of the first threaded section until the second threaded section has engaged with the first threaded section and, in the process, the cover part has been moved from the covering position to the end position.

4 Claims, 4 Drawing Sheets

U.S. PATENT DOCUMENTS

| | | | | |
|---|---|---|---|---|
| 5,207,588 | A | 5/1993 | Ladouceur et al. | |
| 5,292,264 | A | 3/1994 | Blank | |
| 5,356,255 | A * | 10/1994 | Takahashi et al. | 411/431 |
| 5,413,500 | A | 5/1995 | Tanaka | |
| 5,441,417 | A | 8/1995 | Ladouceur et al. | |
| 5,442,133 | A | 8/1995 | Arnold et al. | |
| 5,446,957 | A * | 9/1995 | Wu | 29/424 |
| 5,487,686 | A | 1/1996 | Sawada | |
| 5,590,992 | A | 1/1997 | Russell | |
| 5,644,830 | A | 7/1997 | Ladouceur et al. | |
| 5,655,936 | A | 8/1997 | Meredith | |
| 5,707,257 | A | 1/1998 | Kotajima et al. | |
| 5,791,848 | A | 8/1998 | Lanham | |
| 5,944,465 | A | 8/1999 | Janitzki | |
| 6,027,382 | A | 2/2000 | Reindl et al. | |
| 6,077,096 | A | 6/2000 | Moring et al. | |
| 6,168,445 | B1 | 1/2001 | Seutschniker et al. | |
| 6,179,658 | B1 | 1/2001 | Gunay et al. | |
| 6,203,364 | B1 | 3/2001 | Chupak et al. | |
| 6,210,186 | B1 | 4/2001 | Fink et al. | |
| 6,213,795 | B1 | 4/2001 | Drescher et al. | |
| 6,244,517 | B1 | 6/2001 | Courtois et al. | |
| 6,247,965 | B1 | 6/2001 | Cummings et al. | |
| 6,250,975 | B1 * | 6/2001 | LaPointe | 439/883 |
| 6,276,960 | B1 | 8/2001 | Schaefer et al. | |
| 6,357,110 | B1 | 3/2002 | Shipp et al. | |
| 6,379,162 | B1 | 4/2002 | Raypole et al. | |
| 6,406,307 | B2 | 6/2002 | Bungo et al. | |
| 6,485,337 | B2 | 11/2002 | Hsieh | |
| 6,491,487 | B1 | 12/2002 | Wojciechowski | |
| 6,508,666 | B1 | 1/2003 | Francis | |
| 6,607,393 | B2 | 8/2003 | Raypole et al. | |
| 6,676,874 | B1 * | 1/2004 | Muller | 264/249 |
| 6,679,666 | B2 * | 1/2004 | Mizuno et al. | 411/353 |
| 6,746,285 | B2 | 6/2004 | Delcourt et al. | |
| 6,789,993 | B2 * | 9/2004 | Ozawa et al. | 411/546 |
| 6,877,997 | B2 | 4/2005 | Schäty | |
| 7,083,479 | B2 | 8/2006 | Muller et al. | |
| 7,465,137 | B2 * | 12/2008 | Dietz et al. | 411/386 |
| 2002/0115317 | A1 | 8/2002 | Delcourt et al. | |
| 2003/0017391 | A1 | 1/2003 | Peterson et al. | |

FOREIGN PATENT DOCUMENTS

| | | | |
|---|---|---|---|
| DE | 296 16 631 | U1 | 9/1996 |
| DE | 296 16 631 | | 11/1996 |
| DE | 195 38 256 | | 4/1997 |
| DE | 197 41 830 | A1 | 3/1999 |
| DE | 101 07 231 | | 8/2002 |
| DE | 197 41 830 | B4 | 7/2007 |
| EP | 0 487 365 | | 5/1992 |
| EP | 0 533 421 | | 9/1992 |
| EP | 0 540 030 | | 5/1993 |
| EP | 0 641 944 | A1 | 9/1994 |
| EP | 0 640 404 | | 3/1995 |
| EP | 0 641 944 | | 3/1995 |
| EP | 0 915 531 | | 5/1999 |
| JP | 62-5569 | | 1/1987 |
| WO | WO-2007051771 | | 5/2007 |

OTHER PUBLICATIONS

Emhart Fastening Teknologies—NPR Studs; Internet document published Jul. 1, 1999; 2 pages.

Parker-Kalon—Specialty Screws—Projection Weld Screws; Internet document published Jul. 1, 1999; 4 pages.

Pictures of a ground block with anti-rotation bent tab and hole terminal assembly in use since before at least Apr. 2000.

Photographs of plastic molded anti-rotation wheel of Volkswagen, Germany; dated 1999; 4 pictures.

European Search Report EP, dated for Jun. 20, 2008, 4 pages.

PCT International Search Report, PCT/GB02/00080, 4 pages.

Drawing of weld stud, cap and terminal (believed to have been offered for sale or publicly used prior to Mar. 10, 1999.

Emhart Automotive Drawing of Drawn Arc Stud Welding Sequence (believed to have been offered for sale or publicly used prior to Mar. 10, 1999).

INPR—Plastic Fasteners/Wire Harness Retainers (Emhart internet cite: http://135.145.6.182/products/npr/wire.htm) (believed to have been offered for sale, publicly used or published prior to Mar. 10, 1999).

* cited by examiner

FASTENING ARRANGEMENT

CROSS-REFERENCE TO RELATED APPLICATIONS

This application is a continuation of German Patent Application No. 10 2006 056 065.5, filed Nov. 20, 2006. The disclosure of the above application is incorporated herein by reference.

FIELD

The present invention relates to a fastening arrangement having a first fastening part which is connected to a metal sheet and has a first threaded section and having a second fastening part which has a second threaded section which engages with the first threaded section, with the fastening parts fixing an electrical connecting part in such a manner that an electrical connection is formed between the connecting part and the metal sheet.

The present invention also relates to a prefabricated fastening unit as well as a prefabricated contact-making unit, in particular for a fastening arrangement of the stated type. Finally, the present invention relates to a method for production of a fastening arrangement.

BACKGROUND

A fastening arrangement of this generic type is known from the document EP 0 641 944 A1. It is known from the document EP 0 641 944 A1 for a threaded bolt, onto which a nut is screwed, to be welded to a metal sheet. The arrangement is then lacquered. The nut is then unscrewed, and a cable lug of a cable set is placed on the bolt. The nut is then screwed on again. There is therefore no need subsequently to dispose of special plastic caps which protect the contact surfaces during a lacquering process. However, the unscrewing of the nut, the fitting of the cable lug and the screwing of the nut on again are labor-intensive and susceptible to errors. A similar method is known from EP 0 640 404 A1.

The document DE 101 07 231 AI discloses a nut, into whose thread a screw is screwed, being welded to a metal sheet, with a spacing washer being inserted between the head of the screw and the nut. In order to connect a cable, the screw is unscrewed, the spacing washer is thrown away, and the screw is screwed in again, with a cable lug being fixed in between.

It is also known (DE 195 38 256 AI) for a bolt which is butt-welded to a metal sheet to be provided with an internal thread for a fastening nut to be screwed into. Before the welding process, a disposable cap is placed on the bolt and remains on the bolt until a lacquering process has been completed, thus protecting the internal thread in the bolt during the lacquering process.

Furthermore, it is known from the document EP 0 487 365 A1 for a nut to be soldered to a metal sheet, and for a cable lug to be attached by means of a screw. In this case, it is also proposed that a positioning holder be used in order to fix the relative angular position between the nut and the cable lug.

The document DE 296 16 631 U1 discloses a fastening arrangement with a threaded bolt being welded to a metal sheet in such a manner that a bolt flange is at a distance from the surface of the metal sheet. A plastic holder is clipped onto the threaded bolt. This plastic holder has a plurality of vertical pins which have lateral webs at their free ends. In order to insert a cable lug, the lug is paced onto the threaded bolt, with a neck of the cable lug being pushed through between two lateral webs, so that the cable lug is held captive on the plastic holder. In this way, a plurality of cable lugs can be prefitted to the holder which is attached to the bolt, before a nut is screwed onto the threaded bolt.

In general, the present invention relates to the field of so-called earthing bolts, as are widely used in particular in motor-vehicle engineering. In order to make a robust earth contact, a bolt or a nut is welded to a metal sheet of the vehicle bodywork, so that the bolt or the nut is electrically conductively connected to the metal sheet. A connecting part such as a cable lug is then electrically connected to the bolt or the nut, by screwing a nut onto the bolt or by screwing a screw into the nut. One general problem in this case is that a lacquering process is carried out between the bolt (nut) being welded on and the connecting part (cable lug) being fixed. In order to keep the contact surfaces free of lacquer while an electrical connection is being made, it is known, as described above, for the contact sections to be covered. The cover parts are in this case thrown away before the connecting part is fixed. If, as is described in the initially cited EP 0 641 944 AI, covering is provided by means of a nut which is also once again then used to attach the connecting part, no parts are thrown away during the assembly process. However, the assembly process is somewhat more complex overall.

Furthermore, it is known from the document DE 296 16 631 UI for a plastic holder to be provided on a bolt, onto which a plurality of cable lugs can then be clipped in order to fix them before they are jointly attached to the threaded bolt by means of a nut. In this variant as well, the assembly process is admittedly simplified, but a plurality of assembly steps are required.

SUMMARY

Against the above background, the object of the present invention is to provide an improved fastening arrangement, an improved prefabricated fastening unit for such a fastening arrangement, an improved method for production of a fastening arrangement, as well as an improved prefabricated contact unit.

In the case of the fastening arrangement mentioned initially, this object is achieved in that a cover part is fixed to the first fastening part in an end position and, in a covering position, has covered at least a part of the first threaded section until the second threaded section has engaged with the first threaded section, and, in the process, the cover part has been moved from the covering position to the end position.

Furthermore, the above object is achieved by a prefabricated fastening unit for a fastening arrangement such as this, having a fastening part which can be joined integrally to a metal sheet and has a threaded section, and having a cover part which is fixed to the fastening part in a covering position in which the cover part covers at least a part of the threaded section, in which case the cover part can be moved on the fastening part from the covering position to an end position, in which the cover part is fixed to the fastening part, and, at least not completely, covers the threaded section.

Furthermore, the above object is achieved by a method for production of a fastening arrangement, in particular of the type described above, having the following steps:

- a first fastening part is joined to a workpiece, with the first fastening part having a first connection section which is covered at least partially by a cover element, which is held captive in a covering position on the first fastening part;
- the workpiece is coated with the first fastening part joined to it;

a second fastening part is provided, and has a second connection section; and the fastening parts are connected by means of the connection sections, with the cover element being moved from the covering position to an end position in which it is held captive on the first fastening part.

One particular advantage of the fastening arrangement according to the invention, of a fastening unit according to the invention and of the production method according to the invention, according to a first aspect of the invention, is that a cover part is initially provided in a covering position on the first fastening part (for example a bolt or a nut). The cover part is in this case held captive on the fastening part, so that the cover part covers the threaded section of the first fastening part, and thus protects it against being insulated by varnish or any other coating. The cover element is not moved from the covering position to an end position until the threaded sections of the fastening parts have engaged with one another, to be precise on the first fastening part, where it remains and is held captive on it. In consequence, the assembly process does not include any step for disposal of cover parts that have been thrown away.

The movement of the cover element from the covering position to the end position preferably takes place during the connection step, so that no separate assembly step is required for this purpose.

By way of example, the cover part may be produced from a plastic part. In this case, the total weight of the fastening arrangement is increased only slightly, even though the cover part remains permanently on the first fastening part. The threaded sections of the first and of the second fastening part may be conventional prefabricated threaded sections (M2, M3, M4, etc.). In the situation in which a threaded section is in the form of a self-tapping threaded section, the other threaded section need not, however, necessarily have a threaded shape, but may be in the form of a section which can be tapped.

It is also self-evident that the cover part which is moved from the covering position to the end position may be a section of a larger part which, in the covering position, is fixed to the first fastening part, for example with the larger part possibly being a cap which is broken through during connection of the fastening parts, so that the broken-through part is a cover part for the purposes of the present invention. For example, the larger part may also be a film which, in the covering position, covers at least a part of the first threaded section. If a plastic cap is used, a predetermined breaking point can be provided for the cover part to be broken through.

According to a second aspect of the present invention, the above object is achieved by a prefabricated contact-making unit, in particular for a fastening arrangement according to the first aspect of the invention, with the contact-making unit having a second fastening part with a second threaded section. The second threaded section can be engaged with a first threaded section on a first fastening part, which is joined to a metal sheet or the like. Furthermore, the contact-making unit has at least one electrical connecting part, which is connected to an electrical line and can be fixed between the first and the second fastening part in order to form an electrical connection between the first fastening part and the connecting part. Finally, the contact-making unit has a holding part by means of which the second fastening part and the electrical connecting part are held captive on one another.

In this second aspect of the invention, a connection is formed between a second fastening part (for example a screw or a nut) and an electrical connecting part via a holding part, which is preferably in the form of a cage and is produced from plastic.

In consequence, a captive connection can be formed between the electrical connecting part which is connected to the cable harness and a second fastening part by means of a holding part, even during the production of a cable set or cable harness. In other words, the second fastening part is in this case part of the cable set. There is therefore no need during in-situ installation to first of all to connect a connecting part to the first fastening part and then to connect the second fastening part to the first fastening part, as is the case in the prior art described in the introduction. In fact, the step of connection of the first and of the second fastening part can be carried out during the fixing of the connecting part and while making electrical contact between the connecting part and the first fastening part, in a single installation step. Furthermore, the number of components that need to be stocked is reduced. Finally, there is no need to first of all detach a second fastening part from the first fastening part in order subsequently to place a connecting part such as a cable lug between them, and to connect the fastening parts to one another again.

It is self-evident that the prefabricated contact-making unit according to the second aspect of the invention is preferably used in conjunction with the fastening arrangement or the fastening unit and in conjunction with the production method according to the invention according to the first aspect of the invention.

Although it is in general assumed that a first fastening part is joined to a metal sheet, the first fastening part can be attached to any type of workpiece for the purposes of the present invention. The expression metal sheet should to this extent be understood on a wide basis. Furthermore, it is self-evident that it is preferable for the first fastening part to be connected to the metal sheet by means of so-called "stud welding" (short-time arc welding). However, in general it is also feasible for the first fastening part to be connected to the metal sheet by means of a conductive adhesive or the like. Other joining techniques such as rivets are also intended to be covered by the invention.

It is particularly preferable for the first fastening part to be in the form of a bolt (stud). In this embodiment, it is possible to make use of established joining techniques for connection to the metal sheet, for example by stud welding as mentioned. Furthermore, studs cost little.

In general, it is possible to also weld on a sleeve instead of a stud, on whose internal circumference the first threaded section is formed.

However, it is particularly preferable for the stud to have a blind hole on whose internal circumference the first threaded section is formed.

In this embodiment, the first threaded section can be covered with comparatively little complexity by the cover part in the covering position.

It is thus particularly preferable for the cover part to be arranged in the area of the base of the blind hole in the end position. In this case, the blind hole is closed by the connection of the threaded sections to one another, and the cover part is held captive on the base of the blind hole.

When a sleeve is used as the first fastening part, the sheet metal then normally forms a base of the blind hole. The following reference to a stud with a blind hole is accordingly intended to apply equally to a sleeve with a hole through it.

Furthermore, it is advantageous for the cover part to be arranged in the area of the opening of the blind hole, in the covering position.

This allows the blind hole to be completely closed. The prefabricated fastening unit together with the cover part arranged in this way can thus be handled in a simple manner. The risk of the cover part being lost is low since it offers only a small area to act on. Furthermore, this avoids foreign bodies or the like collecting in the blind hole while the fastening unit is being temporarily stored. Furthermore, a hole or the like can be provided in the cover part in order to allow air to be exchanged between the surrounding area and the interior of the blind hole. The hole preferably has a diameter of <1 mm, so that no lacquer or only small amounts of lacquer can enter the interior of the blind hole during a lacquering process or the like. Bubble formation during lacquering can thus be prevented.

Furthermore, in the covering position, the cover part may be in the form of a cap in the area of the opening of the blind hole and, for example is also fitted to the side of the stud or to its external circumference. In this case, it is feasible for the cap or the like to be broken through, with the part that has been broken through then being held as a cover part in the area of the base of the blind hole in the end position.

According to one particularly preferred embodiment, the cover part is in the form of a plug with an external diameter which corresponds to the internal diameter of the blind hole. This allows the plug to be pushed into the blind hole in a simple manner in order in this way to close the opening of the blind hole in the covering position. In general, it is feasible for the cover part to be produced from a metallic material. However, it is preferable for it to be produced from a plastic.

According to a further preferred embodiment, the first or the second threaded section is in the form of a self-tapping (self-cutting) threaded section, and the other threaded section is in the form of a section which can be tapped. This on the one hand makes it possible to provide a fluid-tight or at least liquid-tight, connection in the area of the threaded sections. This considerably reduces the risk of rust, etc. On the other hand, particularly if the first threaded section is in the form of a section which can be tapped, this threaded section is essentially designed to be smooth. It is then possible in a comparatively simple manner to protect this section by means of the cover part in the covering position against external influences (coatings, lacquering, etc.).

Overall, it is likewise preferable for the second fastening part to be in the form of a screw. On the one hand, this makes it possible to "thread" contact sections of the connecting parts onto the screw before the connection to the first fastening part. It is particularly preferable for the second fastening part and the connecting part to be fitted as a prefabricated contact-making unit to the first fastening part, according to the second aspect of the present invention.

Overall, it is likewise preferable for the first fastening part to be shaped to be generally rotationally symmetrical, and to have a twisting prevention section which is not rotationally symmetrical. This makes it possible to ensure that an electrical connecting part which has been fixed to the first fastening part by means of the second fastening part assumes a predefined position and can subsequently no longer be twisted.

Although it is generally preferable for the bolt to have a blind hole, as described above, it is alternatively also possible for the first threaded section to be arranged on the external circumference of the bolt, with the cover part having an annular shape.

In this embodiment, a solid material bolt can be used as the bolt, and can be produced at comparatively low cost. The cover part at least partially covers the first threaded section on the external circumference in order to protect the first threaded section during the coating process or the like. In this case, it is particularly preferable for the cover part to be arranged at the foot of the bolt, in the end position. This allows the cover part to be held captive on the first fastening part in the end position, in this embodiment as well.

With regard to the production method according to the invention, it is particularly advantageous for at least the first fastening part to be produced from an electrically conductive material and for an electrical connecting part to be fixed in between during the connection of the fastening parts, in order to form an electrical connection between the connecting part and the metal sheet. This makes it possible for the connecting part to make electrical contact with the metal sheet or with the workpiece.

In this case, it is particularly advantageous for the electrical connection between the connecting part and the workpiece to be formed essentially via the connection sections. In this case, it is self-evident that an electrical connection is already formed between the first fastening part and the workpiece as a result of the joining process.

In the case of the contact-making unit according to the second aspect of the present invention, it is particularly advantageous for the second fastening part to be a screw and for the connecting part to have a contact section such as an eye or a fork which clasps a shank section of the screw.

Particularly if the contact section is in the form of an eye, it is physically very simple to hold the second fastening part and the electrical connecting part there via the holding part. It is self-evident that it is particularly preferable for the screw or the second fastening part to be movable on the holding part in order, for example, to allow the screw to be twisted relative to the connecting part and in consequence to allow it to be fitted to the first fastening part.

According to a further preferred embodiment, the holding part has elastic holding means for holding the screw in the area of its threaded section. On the one hand, this makes it possible for the connecting part to be held by its contact section between the head of the screw and the elastic holding means. On the other hand, it is possible to twist the screw relative to the holding part, since the holding means are designed to be elastic.

According to a further preferred embodiment, the holding part has at least two pin sections which project from a base of the holding part, in particular in the axial direction, and are designed to hold the connecting part between them. On the one hand, this allows the sections to be used to fix the relative position between the holding part and the connecting part, thus simplifying the subsequent assembly process. On the other hand, it is possible to design the pin sections to be elastic.

It is particularly preferable for a radial opening between the two pin sections to be of such a size that the contact section of the connecting part can be inserted radially into it. The opening can be formed such that only angled insertion is possible, in order to hold the contact section behind the pin sections during subsequent realignment.

Other refinements of the radial opening are also feasible in order to provide a lock for the contact section in the inner part of the holding part. It is particularly preferable for an axial opening between the two pin sections to be of such a size that the second fastening part and/or the connecting part can be inserted axially into it. This makes it possible to insert the second fastening part and/or the connecting part into the holding part.

It is particularly advantageous for the two pin sections to be elastically flexible, so that the second fastening part and/or the connecting part can be clipped into the holding part. This allows the contact-making unit to be prefabricated in a particularly simple manner.

According to a further embodiment, the holding part has a base from which in each case at least two pin sections extend in both axial directions, in which case connecting parts can be inserted into the holding part from both axial directions. In this embodiment, it is possible to connect a holding part to a connecting part and to a second fastening part such that the holding part and the second fastening part are firmly connected to the associated cable set or the like.

If even further connecting parts (for example from other cable sets) have to be connected to the first fastening part during in-situ installation, it is possible for these further connecting parts to be inserted into the holding part from a different axial direction than the connecting parts which have already been inserted.

It is self-evident that a plurality of connecting parts can also be prefabricated on one holding part, in combination with a single second fastening part. In this case, it is also possible for the connecting parts to be prefabricated in the correct position, that is to say for example in a specific relative position with respect to one another (for example by means of the pin sections). The relative position between the connecting parts and the first fastening part may be provided, for example, via a twisting prevention section on the first fastening part.

Overall, earth (grounding) connections for cable sets or cable harnesses can be provided in a considerably simpler manner. The prefabricated cable set with the prefabricated contact-making unit is provided for the installation process. The prefabricated fastening unit will already have been joined to the metal sheet or to the workpiece in advance and, for example, a coating or lacquering process will have already have taken place. The contact-making unit is then connected to the fastening unit for example by screwing the screw into the blind hole in the bolt. During the process, the cover part is moved from the covering position. Furthermore, an electrical contact is made via the threaded sections and/or connection sections. The electrical contact between the connecting part and the screw can be made, for example, via a lower face of the head of the screw.

A plurality of connecting parts can thus be attached (provided that they have been fixed to a holding part) in a single process step. It is impossible for a connecting part to be "forgotten". This avoids costly reworking and simplifies the installation work. The connecting parts may in particular be ring cable lugs which are attached to the ends of the cables of a cable harness (for example by crimping).

It is self-evident that the features mentioned above and those which are still to be explained in the following text can be used not only in the respectively stated combination but also in other combinations or on their own without departing from the scope of the present invention.

DRAWINGS

Exemplary embodiments of the invention will be explained in more detail in the following description, and are illustrated in the drawing, in which.

Figure 3:
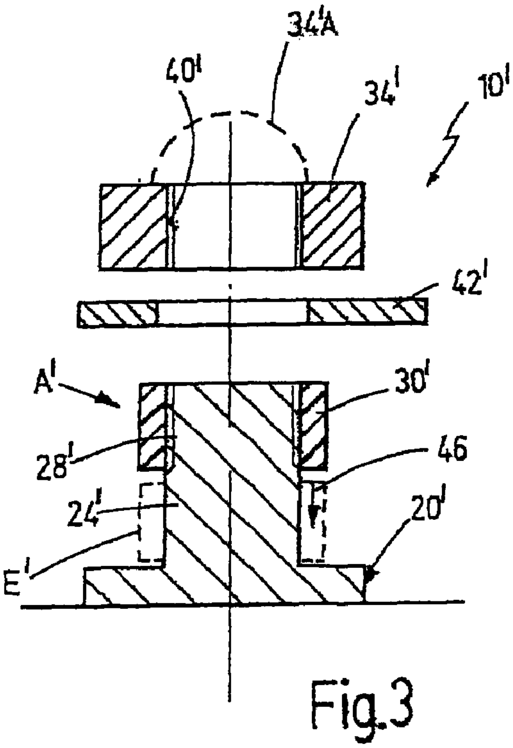
FIG. 3 is a cross sectional elevational view, comparable to that in FIG. 1, of one alternative embodiment of a fastening arrangement according to the invention.
Figure 3A:
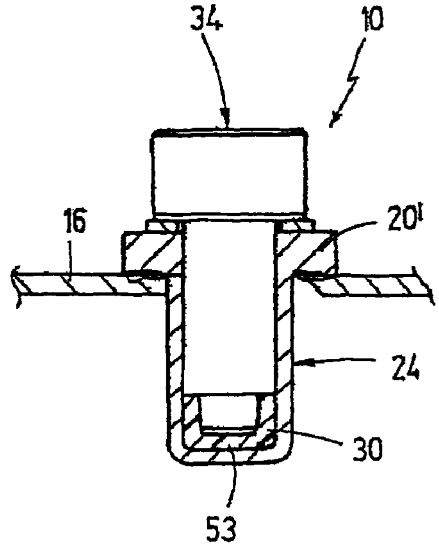
Figure 4:
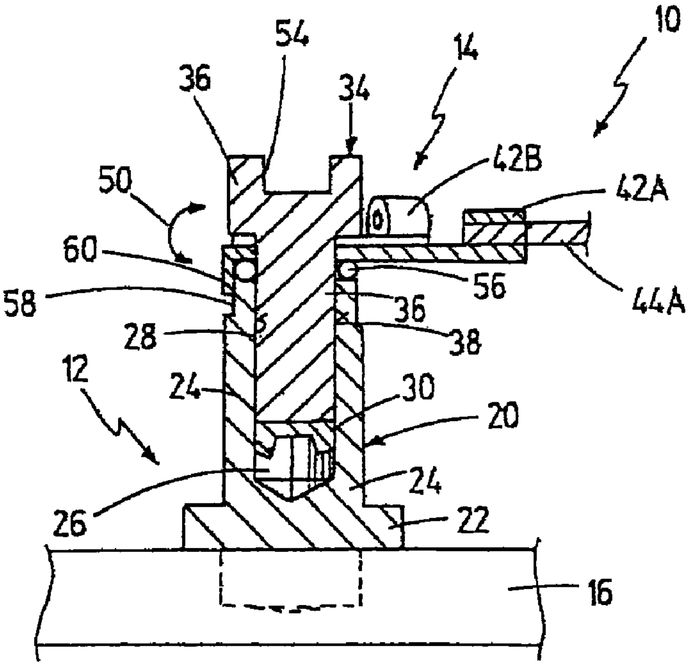
Figures 5, 6:
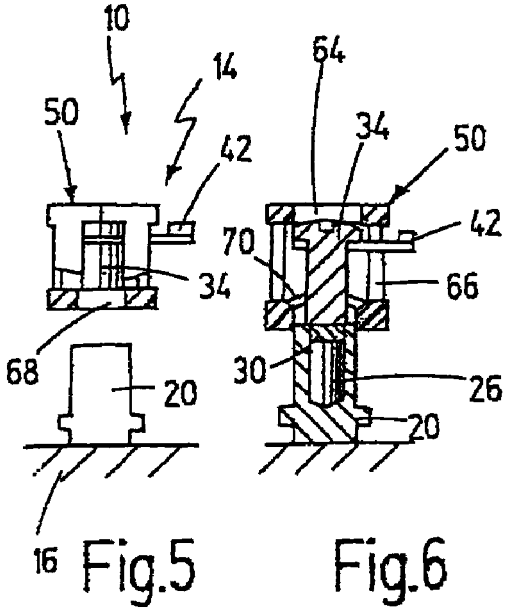
Figure 7:
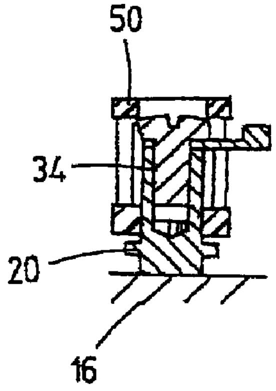
Figure 8:
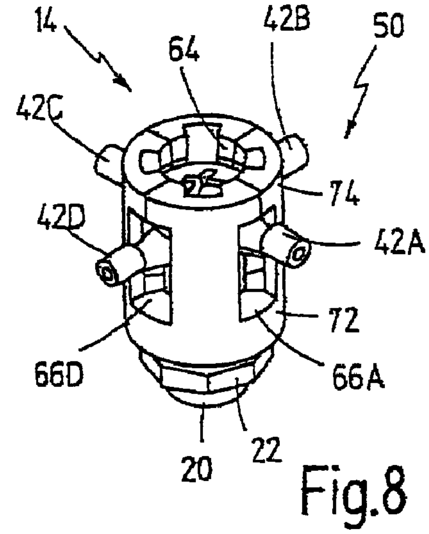
Figure 11:
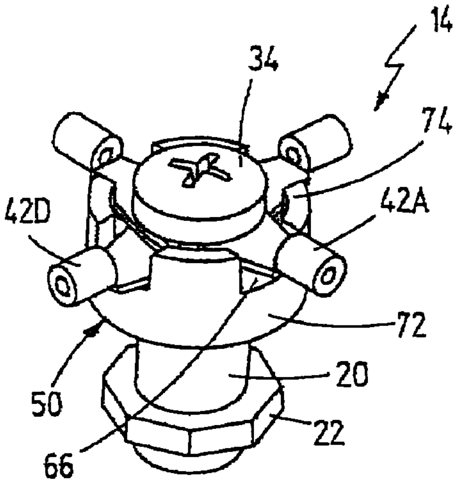
Figure 9:
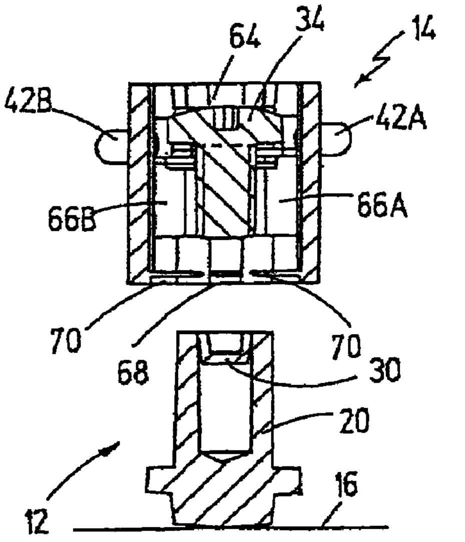
Figure 12:
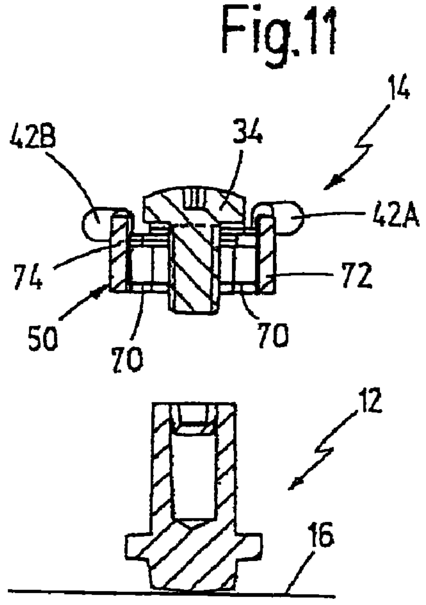
Figure 10:
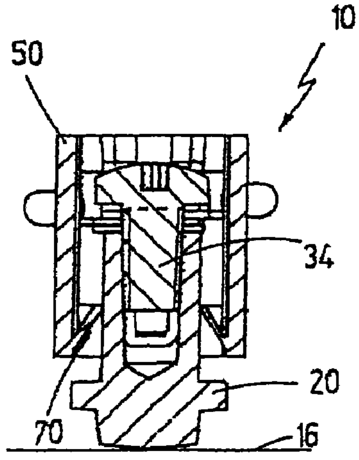
Figure 13:
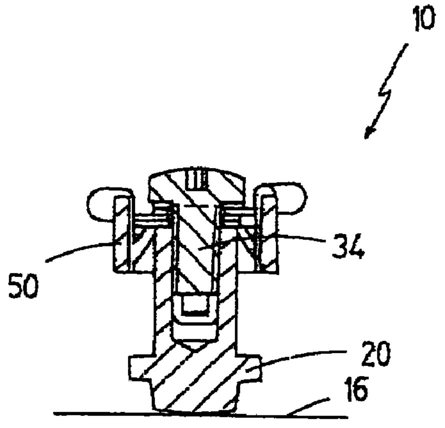
Figure 14:
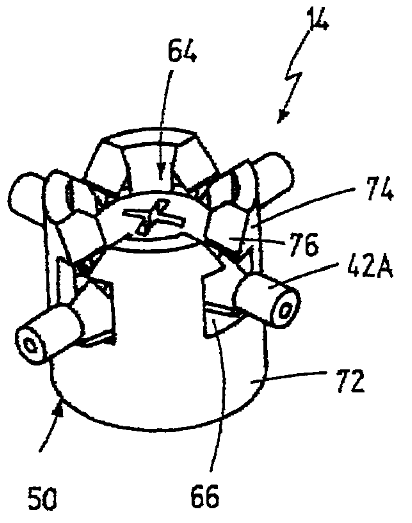
Figure 15:
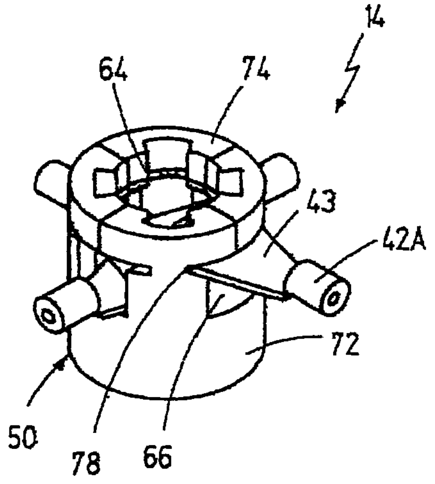
Figure 16:
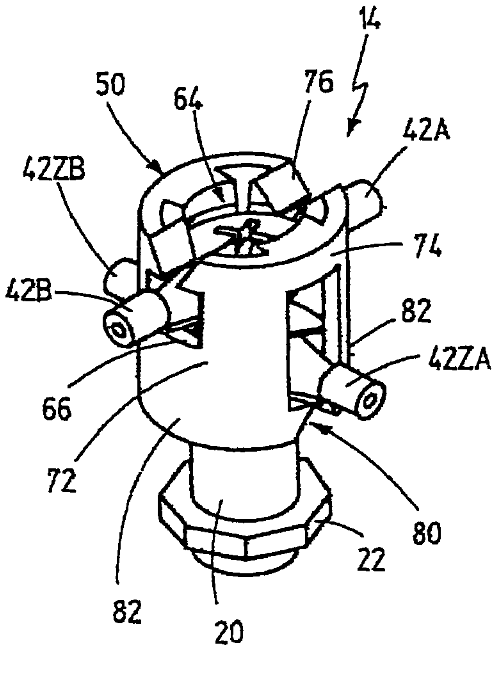
Figure 17:
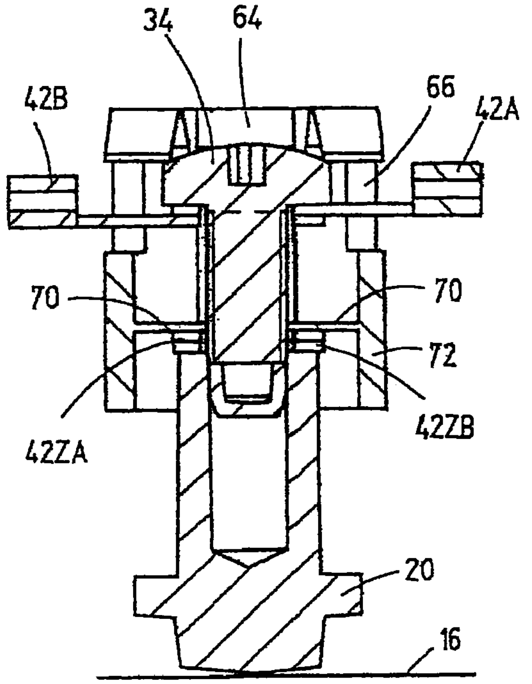

FIG. 3*a* is a cross sectional elevational view showing an end position of a further embodiment of a fastening arrangement according to the invention;

FIG. 4 is a cross sectional elevational view of a further embodiment of a fastening arrangement according to the invention;

FIG. 5 is a partial cross sectional elevational view of a further embodiment of a fastening arrangement according to the invention, with a contact-making unit according to the invention, illustrated in a partially cutaway form;

FIG. 6 is the cross sectional elevational view of the fastening arrangement in FIG. 5 after the contact-making unit has been fitted to a fastening unit;

FIG. 7 is the cross sectional elevational view of the fastening arrangement from FIG. 5, after connection of the contact-making unit to the fastening unit;

FIG. 8 is a side elevational perspective illustration of a further embodiment of a contact-making unit according to the invention;

FIG. 9 is a cross sectional elevational view through the contact-making unit of FIG. 8, shown above a fastening unit;

FIG. 10 is a cross sectional elevational view of a section through the contact-making unit from FIG. 8, shown after connection to the fastening unit;

FIG. 11 is a side elevational perspective illustration of a further embodiment of a contact-making unit according to the invention;

FIG. 12 is a cross sectional elevational view of a section through the contact-making unit from FIG. 8 shown above a fastening unit;

FIG. 13 is a cross sectional elevational view of a section through the contact-making unit from FIG. 8, shown after connection to the fastening unit;

FIG. 14 is a side elevational perspective illustration of a further embodiment of a contact-making unit according to the invention;

FIG. 15 is a side elevational perspective illustration of a further embodiment of a contact-making unit according to the invention;

FIG. 16 is a side elevational perspective illustration of a further embodiment of a contact-making unit according to the invention; and FIG. 17 is a cross sectional elevational view through the contact-making unit from FIG. 16, shown above a fastening unit.

DETAILED DESCRIPTION

Figure 1:
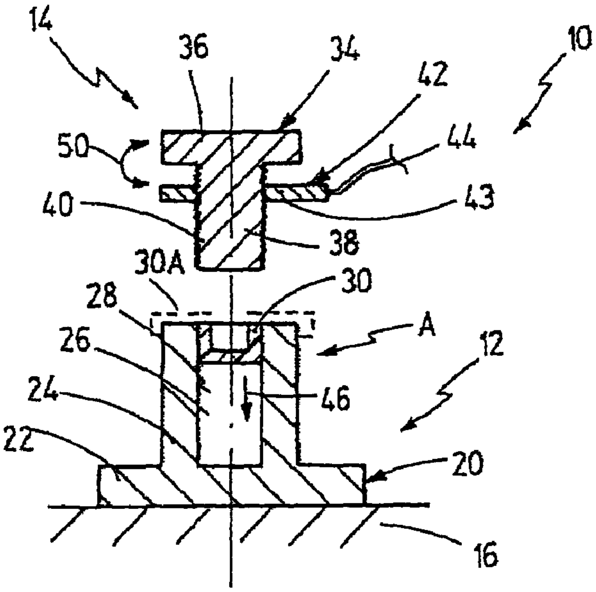
FIG. 1 is a cross sectional elevational view of a fastening arrangement according to one embodiment of the present invention, before connection of a prefabricated contact-making unit to a fastening unit which has been joined to a metal sheet.
Figure 2:
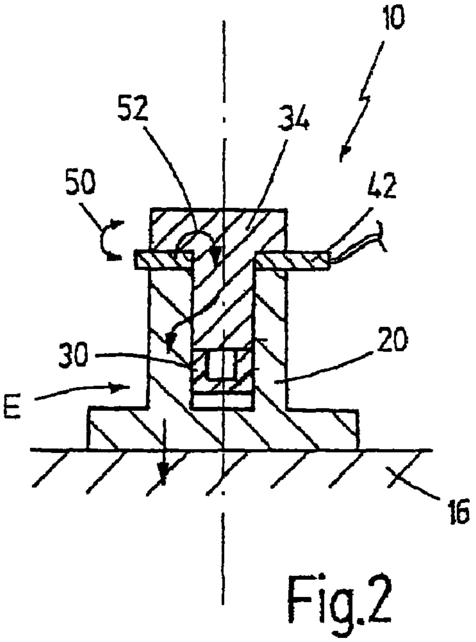
FIG. 2 is the cross sectional elevational view of the fastening arrangement shown in FIG. 1 in an end position, in which the prefabricated contact-making unit is connected to the fastening unit.

In FIGS. 1 and 2, a first embodiment of a fastening arrangement according to the invention is annotated 10 in general. The fastening arrangement 10 has a fastening unit 12 and a contact-making unit 14. The fastening unit 12 is joined to a workpiece in the form of a metal sheet 16.

The fastening unit 12 includes a first fastening part in the form of a bolt (stud) 20, which has a flange section 22 which is joined to the metal sheet 16 (for example by stud welding), and has a shank section 24 which extends vertically upwards from the flange section 22. A blind hole 26 is formed in the flange section 22 and is open at the top. A first threaded section 28 in the form of a section which can be tapped is formed on the internal circumference of the blind hole 26. In other words, the first threaded section 28 on the internal circumference of the blind hole 26 is smooth but, in terms of the material, is designed such that a threaded connection can be produced by means of a self-tapping screw. The material of the bolt 20 may be a steel alloy, aluminum or the like, but in particular it is produced from an electrically conductive material.

A cover part in the form of a plug 30 is inserted into the blind hole 26. The plug 30 is, for example, produced from a plastic material and is pushed into the blind hole 26 so that it seals the blind hole 26 in the area of its opening. The bolt 20 and the plug 30 form a fastening unit 12 which, for example, can be automatically welded to the metal sheet 16 by means of a stud welder.

The bolt 20 is connected to the metal sheet 16 such that an electrically conductive connection is formed between them. It is, for example, also possible to adhesively bond the bolt 20 to the metal sheet 16 by means of a conductive adhesive or the like. The bolt 20 is in the form of an earthing bolt and is designed to be electrically connected to a connecting part in the form of a cable lug 42, in order to electrically connect this connecting lug 42 to earth (for example to the vehicle bodywork as the sheet-metal part 16).

The contact-making unit 14 has a second fastening part in the form of a screw 34, which has a head 36 and a shank 38. A second threaded section in the form of a self-tapping threaded section 40 is formed in the area of the shank 38. The contact-making unit 14 furthermore includes a connecting part in the form of a cable lug 42 which has a contact section 43 in the form of an eye or the like. The contact section 43 is pushed over the shank 38 of the screw 34. The cable lug 42 is connected to an electrical line 44 which, for example, may be part of a cable harness.

The cable lug 42 is preferable in the form of a ring cable lug. A ring cable lug can also carry out the function of a seal in the present application.

The contact-making unit 14 also includes a schematically illustrated holding part 50, which provides a captive connection between the screw 34 and the cable lug 42. The screw 34, the cable lug 42 and the holding part 50 together form a contact-making unit 14 according to the invention. In this case, it is self-evident that the screw 34 is mounted on the holding part 50 such that it can rotate with respect to the cable lug 42, so that the screw 34 can be screwed into the blind hole 26 without having to also rotate the cable lug 42.

Although FIGS. 1 and 2 show the fastening unit 12 connected to a prefabricated contact-making unit 14, it is also possible according to the invention for a conventional self-tapping screw 34 with a cable lug 42 or the like to be screwed into the fastening unit 12 without these parts being connected to one another by means of a holding part 50.

FIG. 1 shows a situation shortly before the screw 34 is screwed into the blind hole 26. In this case, the fastening unit 12 has already been lacquered together with the metal sheet 16, while avoiding the lacquer or the like entering the blind hole 26. This is because the plug 30 is located in the area of the opening of the blind hole 26 in a covering position A, in which it covers at least a part of the first threaded section 28.

When the screw 34 is being screwed into the blind hole 26, the plug 30 is forced downwards as far as an end position E, as is shown in FIG. 2. When in the end position E, the plug 30 no longer has any functional significance, but is held captive on the bolt 20, so that there is no need for the plug 30 to be collected, or the like, during the course of the installation process.

Since the plug 30 has covered the first threaded section 28 until the time at which the screw 34 is screwed in, this ensures a good contact between the screw 34, which is preferably composed of metal, and the bolt 20. Furthermore, the lower face of the head 36 of the screw is designed to form a good contact surface for the cable lug 42.

When the fastening arrangement 10 is in the finished state, as is illustrated in FIG. 2, an electrical connection is in consequence formed between the cable lug 42 and an electrical line 44, which is connected to the cable lug 42, and the metal sheet 16. Thus, for example, an electric current can flow from the cable lug 42 via the lower face of the head 36 of the screw 34 into the screw 34, and from it via the threaded sections 28, 40, into the bolt 20, from where it can flow into the metal sheet 16 via an electrically conductive joint.

This makes it possible to form an earth contact for the electrical line 44 in a physically simple and nevertheless particularly robust manner. The screw 34 is connected to the bolt 20 and, in consequence, the cable lug 42 is connected to the bolt 20 in a single process step by screwing the screw 34 into the blind hole 26. There is no need to throw away a cover part. The cover part 30, in the form of the plug 30, remains in the blind hole 26.

The cable lug 42 is preferably in the form of a ring cable lug and carries out the function of a seal, so that the internal area of the blind hole 26 is sealed when the fastening arrangement 10 is in the finished state.

In the contact-making unit 14 according to the invention, the holding part 50 makes it possible for the screw 34 to be connected in advance to the connecting part, which is in the form of the cable lug 42, for example during the production of a cable harness, which includes the electrical line 44. In consequence, there is no need for separate storage of screws or the like.

The dashed line in FIG. 1 also shows an alternative cover part 30A, which is in the form of a cap which clasps the upper part of the bolt 20. When the screw 34 is being screwed in, this cap 30A is then broken through, so that the broken-through part in the form of a plug 30 is then held in the interior of the blind hole 26.

FIG. 3 shows an alternative embodiment of a fastening arrangement 10' according to the invention. The fastening arrangement 10' includes a bolt 20' composed of solid material, on whose external circumference a threaded section 28' is formed. A cover part in the form of a ring 30' composed of a plastic material is placed on the first threaded section 28', and is shown in a covering position A' in FIG. 3.

In order to connect a cable lug 42' to the bolt 20', a second fastening part in the form of a nut 34' with an internal threaded section 40' is screwed onto the bolt 20'. During this process, the cover part 30' is moved to an end position E' at the foot of a shank 24' of the bolt 20'. It is self-evident that the nut 34' and the cable lug 42' can likewise be connected via a holding part in order to form a contact-making unit according to the invention, although this is not illustrated in FIG. 3.

A plurality of alternative embodiments of fastening arrangements, fastening units and contact-making units will be described in the following text. In terms of their design and in terms of their method of operation, these in general correspond to one of the two already described embodiments in FIGS. 1 to 3. Only the differences will therefore be described in the following text. Identical or similar components are also provided with the same reference numbers.

Numeral 34'A in FIG. 3 also shows that the nut 34' can also be in the form of a cap nut, so that a sealed arrangement can be produced once it has been screwed on. This embodiment allows the formation of corrosion to be prevented better.

FIG. 3*a* shows a further embodiment of a fastening arrangement 10 according to the invention. This corresponds in general to the fastening arrangement in FIGS. 1 and 2. The shank section 20' is formed on an upper area of the bolt 20', so that the bolt 20' is, overall, in the form of a cylindrical bolt for insertion into a hole in the metal sheet 16. The flange section 20' can be welded to the metal sheet 16 by means of a stud-welding process with magnetic arc deflection or the like, or can be joined to it in some other way. In this embodiment, relatively large forces can be applied to the screw 34. It is also self-evident that a solution such as this is generally worthwhile only when a corresponding cavity is provided on the lower face of the metal sheet 16. However, the fastening arrangement 10 is fitted very flat on the upper face of the metal sheet 16.

As can also be seen at 53, the plug 30 can be provided with a small hole which, for example, may have a diameter of <1.0 mm. In the prefabricated state (as is shown by way of example in FIG. 1), this hole is used to allow any air which has been enclosed in the blind hole 26 to escape. This may be important in particular in the event of heating after a lacquering process, as is the case by way of example during lacquer drying. By way of example, the hole may be formed centrally and may be of such a size that essentially no lacquer or the like can enter the blind hole during a lacquering process. Even if lacquer does enter it, this is in any case in an amount which has no disadvantageous effect on the method of operation of the fastening arrangement. This is because the threaded section 28' is covered, as before, by the plug 30, thus ensuring that electrical contact is made.

FIG. 4 shows a further embodiment of a fastening arrangement 10 according to the invention, which in general corresponds to the fastening arrangement in FIGS. 1 and 2. As can be seen, the screw 34 has an internal hexagonal recess (or Torx or the like) 54 in the area of the head, to which an appropriate tool can be fitted.

The figure also shows that not only one cable lug but two cable lugs 42A, 42B (each connected to other electrical lines 44) can be electrically connected to the bolt 20. The cable lugs are arranged, located one above the other, between a lower face of the head 36 and an upper face of the shank section 24 of the bolt 20. Furthermore, in the present embodiment, a sealing washer 56 can be inserted between the lowermost cable lug 42A and the upper face of the shank 24, ensuring permanent sealing of the blind hole 26.

As can also be seen from FIG. 4, a twisting prevention section 58 is formed in the upper area of the shank section 24 and, for example may have a polygonal cross section. Hook sections 60 may also be formed on the cable lugs 42, in order to form a twisting prevention means, and are bent through 90° with respect to a base plane of the cable lug 42 and act on surfaces of the twisting prevention section 58, thus resulting in a fixed relative position between the cable lugs 42 and the bolt.

FIGS. 5 to 7 show a further embodiment of a fastening arrangement according to the invention. The fastening arrangement 10 uses a contact-making unit 14 with a holding part 50 in the form of a plastic cage. The holding part 50 has an axial insertion opening 64 for the insertion of the screw 34. The holding part 50 also has radial openings 66 for the insertion of a cable lug 42 in the radial direction. At the axially lower end, the holding part 50 also has an axial outlet opening 68, via which a shank (which is not annotated in any more detail) of the screw 34 can be screwed downwards into the blind hole 26 in a bolt 20.

Elastic fingers 70 project into the interior of the cage, act on the shank of the screw 34 and hold it relative to the holding part 50. In this case, the cable lug 42 is arranged between the lower face of the head of the screw 34 and the elastic fingers 70. The axial insertion opening 64 can be widened elastically in the radial direction, and is of such a size that the head of the screw 34 can be inserted (clipped in) with the opening 64 being widened radially. The radial openings 66 are also of such a size that the head of the screw 34 cannot pass through them. In consequence, the screw 34 is mounted in a captive form in the holding part 30. The cable lug 42 is also mounted in a captive form on the holding part 50, to be precise indirectly via the screw 34.

The elastic fingers 70 allow the screw 34 not to project significantly out of the axial outlet opening 68 when the contact-making unit 14 is in the prefabricated state. In consequence, there is no risk of the screw 34 being pulled out of the holding part 50. This results in protection against damage to the bodywork, since the screw 34 preferably does not project out of the holding part 50. A further advantage of the elastic fingers 70 is that the screw 34 is centered in the holding part 50, thus allowing it to be screwed securely into the blind hole 26. Furthermore, the fingers 70 are designed such that they cannot enter the contact area between the screw 34 and the cable lugs. This avoids malfunctions.

The screw 34 is screwed in by fitting a tool over the axial insertion opening 64, with the screw 34 being screwed in from above into the blind hole 26 in a bolt 20. During this process, the elastic fingers 70 provide only a comparatively small opposing force. In the screwed-in state, the elastic fingers 70 rest on the external circumference of the bolt 20 and ensure that the holding part 50 is permanently fixed on the bolt 20. The holding part 50 is preferably composed of a plastic material.

Modified embodiments of one such contact-making unit 14 according to tire invention will be described in the following statements. Once again, the following embodiment in general corresponds to the already described embodiments, in terms of design and method of operation. Only the differences will therefore be described in the following text. Identical or similar parts are provided with the same reference numbers.

One alternative embodiment of a contact-making unit 14 according to the invention is illustrated in FIGS. 8 to 10. The design of the holding part 50 of this contact-making unit 14 corresponds in general to that of the holding part 50 in FIGS. 5 to 7. As can also be seen, the holding part 50 has a base 72 which points towards the flange section 22 of the bolt 20 and from which a plurality of pin sections 74 (four in the present case) extend upwards. The pin sections 74 are provided with radial recesses, which form a total of four radial openings 66A-66D. Furthermore, the pin sections 74 are provided with lateral webs at their ends, which together form a ring which can be widened radially, and at whose centre the axial insertion opening 64 is formed.

The radial openings 66 are of such a size that a cable lug 42 can in each case be pushed at an angle into and through the respective opening 66. As soon as the cable lug 42 is once again aligned at right angles to the axial direction of the holding part 50, it grips behind the adjacent pin sections and can no longer be pulled out. Once a cable lug 42 or a plurality of cable tugs 42 (up to four) has or have been inserted through respective radial openings 66, the screw 34 can be inserted in this state, to be precise through the axial insertion opening 64. During this process, the head of the screw 34 forces the pin sections 74 radially outwards, and the axial insertion opening 64 can be designed such that it tapers slightly conically in this area, in order to make it easier to insert the screw 34. Once the head of the screw 34 has been inserted, the pin sections 74 snap back into the position shown in FIG. 8 and FIG. 9, so that the upper ends, which project inwards, of the pin sections 74 grip behind the head of the screw 34, in this way fixing the screw 34 to the holding part 50. In this case, the eyes of the cable lugs 42 are put over the shank of the screw 34, so that the cable lugs can no longer be positioned at an angle. Overall, this results in the screw, 34 and the cable tugs 42 all being mounted in a captive manner on the holding part 50.

A plurality of, for example, four, elastic fingers 70 are arranged in the lower area of the holding part 50, adjacent to the axial outlet opening 63, and extend radially inwards. The elastic fingers 70 hold the shank of the screw 34 in the interior of the holding part 50, so that it cannot project out of the outlet opening 68. The fingers 70 also have a centering function with respect to the screw 34.

As can be seen in FIG. 10, the elastic fingers 70 rest on the external circumference of the shank section of the bolt 20, thus fixing the holding part 50 elastically on the bolt 20.

FIGS. 11 to 13 show a further embodiment of a contact-making unit 14 according to the invention. The holding part 50 of the contact-making unit in FIGS. 11 to 13 differs from the holding part 50 of the contact-making unit in FIGS. 8 to 10 essentially in that an upper area of the pin sections 74 is omitted. In consequence, the radial openings 66 are open at the top. In order to form the contact-making unit 14, the cable lugs 42A-42D are threaded onto the screw 34, and the screw 34 is then pushed from above into the holding part 50, with the elastic fingers 70 acting on the shank of the screw 34, and thus mounting the screw 34 on the holding part 50. The contact sections 43 (which are in the form of eyes) of the cable lugs 42 are in this case put over onto the shank of the screw 34, and are "trapped" between the head of the screw 34 and the elastic fingers 70, thus forming a non-detachable or captive contact-making unit 14.

The holding part 50 of the contact-making unit 14 in FIGS. 11 to 13 can be manufactured at a lower price than the holding part 50 in FIGS. 8 to 10. However, the captive retention security is not as great, since the screw 34 is essentially held only by the elastic fingers 70.

The elastic fingers 70 in the already described embodiments can also be functionally subdivided, with one or more fingers being used to mount the screw 34 on the holding part 50. Other fingers can be designed for subsequently mounting the holding part 50 on the bolt 20. It is also possible to form trapping sections on the bolt 20 (for example on the external circumference of the shank section), behind which associated elastic fingers 70 grip in order to fix the holding part 50 axially on the bolt 20.

A further embodiment of a prefabricated contact-making unit 14 is shown in FIG. 14. In this embodiment, the radial openings 66 are small. A small distance is formed between each of the pin sections 74, and the pin sections 74 are inclined towards this gap, as is shown at 76. In consequence, it is possible to insert the cable lugs 42 through the axial insertion opening 64 from above into the holding part 50, with the method of operation otherwise being essentially identical to that for the holding part 50 in FIGS. 8 to 10.

FIG. 15 shows a further alternative embodiment, in which the cable lugs 42 are once again inserted through the radial openings 66. The radial openings 66 in this case have slotted sections 78, which are designed to be broader in the circumferential direction, and are designed to in each case hold the flat contact section 43 of the cable lugs 42. The cable lugs 42 are then pushed downwards, to a state in which the contact sections 43 are held from the inside against the pin sections 74. Otherwise, the method of operation in general corresponds to that of the holding part 50 in FIGS. 8 to 10.

FIGS. 16 and 17 show a further embodiment of a contact-making unit 14 according to the invention. The holding part 50 of the contact-making unit 14 in FIGS. 16 and 17 has a base 72 and two pin sections 74, which form two gaps between them and are inclined, in a similar manner to the embodiment in FIG. 14. In consequence, two or more cable lugs 42A, 42B can be inserted from above through the axial insertion opening 64 into the holding part 50. A screw 34 can then be pushed through the axial insertion opening 64 from above, in a comparable manner to the embodiment in FIGS. 8 to 10.

However, starting from the base 72, the holding part 50 in FIGS. 16 and 17 has two further pin sections 82, which point downwards and are designed essentially in the same way as the pin sections 74, but rotated through 90°. In consequence, an axial opening 80 is formed on the lower face of the holding part 50, and is also used as a further insertion opening for additional cable lugs 42ZA, 42ZB. Furthermore, the axial opening 80 is also used as an axial outlet opening 68 for the screw 34.

In this embodiment, the cable lugs 42A, 42B together with the holding part 50 and the screw 34 can form a prefabricated contact-making unit 14 according to the invention. However, during the installation process, additional cable lugs 42ZA, 42ZB can be inserted into the holding part 50, for example cable lugs of other cable harnesses, to be precise from underneath through the axial opening 80 into the holding part 50, and can then be electrically connected, together with the cable lugs 42A, 42B, in one process to a bolt 20 and in consequence to a metal sheet 16.

In all of the embodiments of the holding parts 50, it self-evident that the respective lower outlet openings 68 or 80 can also be used for centering of the contact-making unit 14 with respect to the upper face of the bolt 20, before the process of screwing the screw 34 into the blind hole 26 actually takes place.

What is claimed is:

1. A fastening arrangement for forming an electrical connection between a connecting part and a metal sheet using a welding stud, comprising:

a welding nut connected to a metal sheet, the welding nut having an unthreaded smooth bore blind hole;

a fastening part having a threaded section, the threaded section dimensioned to be received in the blind hole for creating a tapped thread in the blind bore, a polymeric cover part having an external diameter corresponding to an internal diameter of the blind bore, the cover part adapted to be slidable away from an initial first position and retained in a second position in the blind hole, the cover part in the first position is sealing but not extending beyond an entrance opening defined by the internal diameter of the blind hole;

an electrical connecting part adapted to be positioned in contact with the welding nut proximate to the cover part and between the welding nut and the fastening part; and the cover part is adapted to slide to the second position when the threaded section is received in the blind hole such that the cover part is retained in the blind hole by the fastening part.

2. The fastening arrangement according to claim 1, further comprising a base of the blind hole, the cover part adapted to be slidable within the blind hole until the cover part is positioned proximate to the base in the second position.

3. The fastening arrangement according to claim 1, wherein the cover part includes a hole having a diameter less than 1.0 mm, the hole permitting air in the blind hole to escape from the blind hole as the cover part moves from the first position to the second position.

4. The fastening arrangement according to claim 1, wherein the fastening part and the electrical connecting part are rotatably connected together defining a connecting part prior to the fastening part being received in the blind hole.

* * * * *